United States Patent
Akutsu et al.

(10) Patent No.: US 10,689,178 B2
(45) Date of Patent: Jun. 23, 2020

(54) PACKING CONTAINER HAVING EXCELLENT SLIPPING PROPERTY FOR THE CONTENT

(71) Applicant: Toyo Seikan Group Holdings, Ltd, Tokyo (JP)

(72) Inventors: Yosuke Akutsu, Yokohama (JP); Shinya Iwamoto, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 14/402,798

(22) PCT Filed: Jul. 5, 2013

(86) PCT No.: PCT/JP2013/068541
§ 371 (c)(1),
(2) Date: Nov. 21, 2014

(87) PCT Pub. No.: WO2014/010534
PCT Pub. Date: Jan. 16, 2014

(65) Prior Publication Data
US 2015/0108032 A1   Apr. 23, 2015

(30) Foreign Application Priority Data

Jul. 13, 2012   (JP) ................................ 2012-157744
Sep. 11, 2012   (JP) ................................ 2012-199236

(51) Int. Cl.
*B32B 3/30*       (2006.01)
*B08B 17/06*    (2006.01)
(Continued)

(52) U.S. Cl.
CPC ................ *B65D 81/24* (2013.01); *B32B 1/02* (2013.01); *B32B 7/12* (2013.01); *B32B 15/08* (2013.01);
(Continued)

(58) Field of Classification Search
CPC ...... B65D 85/72; B65D 1/0215; B65D 65/42; C09D 5/1681; C09D 5/1693;
(Continued)

(56) References Cited

U.S. PATENT DOCUMENTS 3,354,022 A * 11/1967 Johnson, Jr. ............ B08B 17/02
264/284
3,473,952 A * 10/1969 McFadden .............. A47J 36/02
148/251

(Continued)

FOREIGN PATENT DOCUMENTS

CN    1123381 A    5/1996
CN    1332034 A    1/2002
(Continued)

OTHER PUBLICATIONS

Michael Nosonovsky, "Slippery when wetted", Nature, Sep. 22, 2011, pp. 412-413, vol. 477, No. 7365.
(Continued)

*Primary Examiner* — Gideon R Weinerth
(74) *Attorney, Agent, or Firm* — Sughrue Mion, PLLC

(57) ABSTRACT

A packing container featuring markedly improved slipping property and non-adhering property for its contents. In the packing container filled with a content (7), at least part of the surface that comes in contact with the content (7) is a liquid-permeable surface (1) which holds a lubricating liquid (5) different from the content (7).

7 Claims, 3 Drawing Sheets

(51) Int. Cl.

| | | |
|---|---|---|
| *B32B 33/00* | (2006.01) | |
| *B05D 5/08* | (2006.01) | |
| *C08J 7/04* | (2020.01) | |
| *B65D 81/24* | (2006.01) | |
| *B32B 27/32* | (2006.01) | |
| *B32B 27/36* | (2006.01) | |
| *B32B 27/30* | (2006.01) | |
| *B32B 27/22* | (2006.01) | |
| *B32B 1/02* | (2006.01) | |
| *B32B 15/08* | (2006.01) | |
| *B32B 27/08* | (2006.01) | |
| *B65D 1/02* | (2006.01) | |
| *B65D 85/72* | (2006.01) | |
| *B32B 15/20* | (2006.01) | |
| *B65D 23/02* | (2006.01) | |
| *B32B 27/34* | (2006.01) | |
| *B32B 7/12* | (2006.01) | |
| *B32B 27/20* | (2006.01) | |
| *C09K 3/18* | (2006.01) | |
| *C09D 5/16* | (2006.01) | |
| *B65D 25/14* | (2006.01) | |
| *B65D 65/40* | (2006.01) | |

(52) U.S. Cl.
CPC ............. *B32B 15/20* (2013.01); *B32B 27/08* (2013.01); *B32B 27/20* (2013.01); *B32B 27/22* (2013.01); *B32B 27/306* (2013.01); *B32B 27/32* (2013.01); *B32B 27/325* (2013.01); *B32B 27/34* (2013.01); *B32B 27/36* (2013.01); *B65D 1/0207* (2013.01); *B65D 23/02* (2013.01); *B65D 85/72* (2013.01); *B05D 5/08* (2013.01); *B32B 2307/412* (2013.01); *B32B 2307/538* (2013.01); *B32B 2307/726* (2013.01); *B32B 2307/7242* (2013.01); *B32B 2307/7244* (2013.01); *B32B 2307/744* (2013.01); *B32B 2439/46* (2013.01); *B32B 2439/60* (2013.01); *B32B 2439/70* (2013.01); *B65D 25/14* (2013.01); *B65D 65/40* (2013.01); *C09D 5/1656* (2013.01); *C09D 5/1681* (2013.01); *C09D 5/1693* (2013.01); *C09K 3/18* (2013.01); *Y10T 428/24355* (2015.01); *Y10T 428/24372* (2015.01)

(58) Field of Classification Search
CPC ............ C09D 5/1656; Y10T 428/2839; B32B 2307/73; B32B 2307/746; B32B 2439/62; B32B 2439/70
USPC .............. 206/219; 73/53.01; 428/315.5, 141; 165/133; 426/106; 215/12.2
See application file for complete search history.

(56) References Cited

U.S. PATENT DOCUMENTS

| | | | | |
|---|---|---|---|---|
| 3,931,428 A * | 1/1976 | Reick | ............... | C08J 9/42 428/149 |
| 4,204,021 A * | 5/1980 | Becker | ............... | A47J 36/02 427/193 |
| 4,534,930 A * | 8/1985 | Nohara | ............... | B65D 1/0215 264/513 |
| 5,674,625 A * | 10/1997 | Takahashi | ............... | C03C 17/007 428/142 |
| 5,838,445 A * | 11/1998 | Sandhu | ............... | G01B 13/22 356/138 |
| 5,955,165 A * | 9/1999 | Zamora | ............... | B65D 1/0215 428/36.9 |
| 6,299,981 B1 * | 10/2001 | Azzopardi | ............... | C03C 15/00 427/163.1 |
| 6,503,588 B1 * | 1/2003 | Hayashi | ............... | B32B 27/30 428/36.7 |
| 6,982,787 B1 * | 1/2006 | Wapner | ............... | B01L 3/502746 356/138 |
| 8,535,779 B1 * | 9/2013 | Smith | ............... | B65D 23/02 428/141 |
| 8,795,812 B2 * | 8/2014 | Mazumder | ............... | C03C 17/28 264/239 |
| 8,974,889 B2 * | 3/2015 | Bulliard | ............... | B82Y 30/00 428/143 |
| 9,040,145 B2 * | 5/2015 | Lyons | ............... | B32B 5/16 428/141 |
| 9,625,075 B2 * | 4/2017 | Smith | ............... | F16L 58/04 |
| 9,862,525 B2 * | 1/2018 | Akutsu | ............... | B65D 47/40 |
| 9,947,481 B2 * | 4/2018 | Solomon | ............... | H01M 8/02 |
| 10,293,449 B2 * | 5/2019 | Schlechte | ............... | B24B 1/00 |
| 2002/0099134 A1 * | 7/2002 | Bertin | ............... | B32B 27/30 525/57 |
| 2003/0096083 A1 | 5/2003 | Morgan et al. | | |
| 2003/0147932 A1 * | 8/2003 | Nun | ............... | A01N 25/34 424/405 |
| 2004/0209072 A1 * | 10/2004 | Henze | ............... | A47J 36/02 428/336 |
| 2005/0118911 A1 * | 6/2005 | Oles | ............... | B05D 1/18 442/118 |
| 2006/0040375 A1 | 2/2006 | Arney et al. | | |
| 2006/0147675 A1 * | 7/2006 | Nun | ............... | B05D 5/08 428/141 |
| 2006/0263516 A1 * | 11/2006 | Jones | ............... | C03C 17/007 427/180 |
| 2006/0266700 A1 * | 11/2006 | Ku | ............... | B01D 39/1676 210/500.21 |
| 2007/0087190 A1 | 4/2007 | Akiyama et al. | | |
| 2007/0141305 A1 * | 6/2007 | Kasai | ............... | B08B 17/06 428/143 |
| 2007/0298216 A1 * | 12/2007 | Jing | ............... | B05D 5/08 428/141 |
| 2008/0105689 A1 * | 5/2008 | Ren | ............... | A47J 27/002 220/573.2 |
| 2008/0283483 A1 * | 11/2008 | Kim | ............... | B65D 23/02 215/12.2 |
| 2008/0286480 A1 * | 11/2008 | Kim | ............... | B65B 61/00 427/427.1 |
| 2009/0196990 A1 * | 8/2009 | Simpson | ............... | B05D 5/083 427/203 |
| 2009/0264836 A1 * | 10/2009 | Roe | ............... | A61F 13/511 604/289 |
| 2009/0304996 A1 * | 12/2009 | Kishikawa | ............... | B32B 5/16 428/141 |
| 2010/0004373 A1 * | 1/2010 | Zhu | ............... | C09D 133/08 524/448 |
| 2010/0028604 A1 * | 2/2010 | Bhushan | ............... | B05D 1/60 428/156 |
| 2010/0047523 A1 * | 2/2010 | Kim | ............... | B05D 5/08 428/144 |
| 2010/0092621 A1 | 4/2010 | Akutsu et al. | | |
| 2010/0098909 A1 * | 4/2010 | Reyssat | ............... | B08B 17/06 428/141 |
| 2010/0285275 A1 * | 11/2010 | Baca | ............... | C03C 3/083 428/141 |
| 2011/0008612 A1 * | 1/2011 | Lee | ............... | B08B 17/06 428/325 |
| 2011/0077172 A1 * | 3/2011 | Aizenberg | ............... | B81C 1/00206 506/16 |
| 2011/0104439 A1 * | 5/2011 | Choi | ............... | C03C 15/00 428/142 |
| 2011/0160374 A1 * | 6/2011 | Jin | ............... | B82Y 30/00 524/493 |
| 2011/0212296 A1 * | 9/2011 | Eigenbrod | ............... | B05D 5/02 428/141 |
| 2011/0212298 A1 | 9/2011 | Nakano et al. | | |
| 2011/0283778 A1 * | 11/2011 | Angelescu | ............... | B01D 69/02 73/53.01 |
| 2012/0003427 A1 * | 1/2012 | Kuroda | ............... | B32B 7/02 428/141 |
| 2012/0118886 A1 | 5/2012 | Sekiguchi et al. | | |

(56) References Cited

U.S. PATENT DOCUMENTS

| | | | |
|---|---|---|---|
| 2012/0128963 A1* | 5/2012 | Mao | B82Y 30/00 428/304.4 |
| 2012/0276334 A1* | 11/2012 | Fedynyshyn | B05D 5/04 428/141 |
| 2012/0282458 A1* | 11/2012 | Takeda | C03C 17/3411 428/331 |
| 2013/0032316 A1 | 2/2013 | Dhiman et al. | |
| 2013/0034695 A1 | 2/2013 | Smith et al. | |
| 2013/0220813 A1* | 8/2013 | Anand | B08B 17/065 204/471 |
| 2013/0251769 A1* | 9/2013 | Smith | B65D 85/72 424/401 |
| 2013/0251946 A1* | 9/2013 | Azimi | B05D 5/00 428/142 |
| 2013/0251948 A1* | 9/2013 | Lyons | B32B 5/16 428/148 |
| 2013/0251952 A1* | 9/2013 | Smith | B65D 23/02 428/161 |
| 2013/0309450 A1* | 11/2013 | Khine | B08B 17/065 428/141 |
| 2013/0323466 A1* | 12/2013 | Baca | B08B 17/065 428/141 |
| 2013/0333789 A1* | 12/2013 | Smith | F16L 58/04 138/145 |
| 2014/0147627 A1 | 5/2014 | Aizenberg et al. | |
| 2014/0187666 A1 | 7/2014 | Aizenberg et al. | |
| 2014/0246429 A1* | 9/2014 | Song | A47J 47/02 220/62.13 |
| 2014/0290699 A1* | 10/2014 | Bengaluru Subramanyam | B65D 25/14 134/22.1 |
| 2014/0290731 A1 | 10/2014 | Aizenberg et al. | |
| 2014/0290732 A1 | 10/2014 | Aizenberg et al. | |
| 2014/0314975 A1* | 10/2014 | Smith | B05C 7/00 428/34.1 |
| 2014/0332570 A1* | 11/2014 | Akutsu | B32B 5/16 428/34.1 |
| 2015/0005964 A1 | 1/2015 | Liotta | |
| 2015/0108032 A1* | 4/2015 | Akutsu | B65D 23/02 206/524.4 |
| 2015/0152270 A1* | 6/2015 | Aizenberg | A61L 29/085 210/500.27 |
| 2015/0174625 A1* | 6/2015 | Hart | B08B 17/065 428/141 |
| 2015/0175317 A1* | 6/2015 | Imai | B65D 77/2032 220/200 |
| 2015/0175814 A1* | 6/2015 | Aizenberg | B08B 17/06 428/312.8 |
| 2015/0179321 A1* | 6/2015 | Khalil | H01F 1/442 137/13 |
| 2015/0196940 A1* | 7/2015 | Aizenberg | B05D 5/08 428/141 |
| 2015/0209846 A1* | 7/2015 | Aizanberg | A61L 29/06 428/142 |
| 2015/0273791 A1* | 10/2015 | Schimmel | B63B 1/38 156/60 |
| 2015/0306642 A1* | 10/2015 | Smith | B08B 17/065 428/34.4 |
| 2015/0306852 A1* | 10/2015 | Fujiwara | B32B 27/18 428/35.7 |
| 2015/0314554 A1* | 11/2015 | Fujiwara | B32B 27/20 428/35.7 |
| 2015/0353271 A1* | 12/2015 | Akutsu | B65D 23/0807 206/524.3 |
| 2016/0039557 A1* | 2/2016 | Akutsu | B29C 49/24 206/524.6 |
| 2016/0075117 A1* | 3/2016 | Akutsu | B32B 27/08 428/339 |
| 2016/0130487 A1* | 5/2016 | Iwamoto | C08J 7/0427 428/36.4 |
| 2016/0152786 A1* | 6/2016 | Akutsu | B65D 1/0215 428/35.7 |
| 2017/0043372 A1* | 2/2017 | Iwamoto | B32B 27/14 |
| 2017/0101207 A1* | 4/2017 | Iwamoto | B65D 1/0207 |
| 2017/0190139 A1* | 7/2017 | Haghdoost | B32B 3/18 |
| 2017/0283316 A1* | 10/2017 | Meuler | B05D 5/08 |
| 2018/0086037 A1* | 3/2018 | Araki | B32B 27/18 |
| 2018/0134004 A1* | 5/2018 | Nyuu | B32B 17/06 |
| 2018/0147604 A1* | 5/2018 | Dai | B05D 5/08 |
| 2018/0155081 A1* | 6/2018 | Nyuu | A23L 29/20 |
| 2018/0155239 A1* | 6/2018 | Wong | C09D 5/1681 |
| 2018/0162580 A1* | 6/2018 | Nyuu | B32B 33/00 |
| 2018/0162595 A1* | 6/2018 | Komatsu | B32B 27/32 |
| 2018/0229891 A1* | 8/2018 | Nyuu | B05D 7/54 |
| 2018/0305065 A1* | 10/2018 | Akutsu | B65D 85/72 |
| 2018/0346195 A1* | 12/2018 | Iwamoto | B65D 1/00 |
| 2019/0039796 A1* | 2/2019 | Farnham | B64D 15/06 |
| 2019/0136073 A1* | 5/2019 | Bake | H02S 40/10 |
| 2019/0291384 A1* | 9/2019 | Seito | B32B 27/32 |
| 2019/0300717 A1* | 10/2019 | Akaishi | C03C 17/30 |
| 2019/0335596 A1* | 10/2019 | Wu | C03C 17/42 |
| 2019/0351450 A1* | 11/2019 | Yoshida | C09D 127/12 |
| 2020/0071023 A1* | 3/2020 | Nyuu | B65D 23/02 |

FOREIGN PATENT DOCUMENTS

| | | |
|---|---|---|
| CN | 1836072 A | 9/2009 |
| CN | 101563301 A | 10/2009 |
| JP | 6-99481 A | 4/1994 |
| JP | 2000-136251 A | 5/2000 |
| JP | 2002-120861 A | 4/2002 |
| JP | 2003-149402 A | 5/2003 |
| JP | 2005-145491 A | 6/2005 |
| JP | 2005-274573 A | 10/2005 |
| JP | 2007002241 A | 1/2007 |
| JP | 2007-145408 A | 6/2007 |
| JP | 2007-284066 A | 11/2007 |
| JP | 2008093833 A | 4/2008 |
| JP | 2008-222291 A | 9/2008 |
| JP | 2009-202929 A | 9/2009 |
| JP | 2009-214914 A | 9/2009 |
| JP | 2010-254377 A | 11/2010 |
| JP | 2012-17117 A | 1/2012 |
| JP | 4878650 B2 | 2/2012 |
| JP | 2015-501655 A | 1/2015 |
| WO | 2009/110236 A1 | 9/2009 |
| WO | 2012/100099 A2 | 7/2012 |
| WO | 2013/022467 A2 | 2/2013 |

OTHER PUBLICATIONS

Tak-Sing Wong et al., "Bioinspired self-repairing slippery surfaces with pressure-stable omniphobicity", Nature, Sep. 22, 2011, pp. 443-447, vol. 477, No. 7365.

Austin Carr, "MIT's Freaky Non-Stick Coating Keeps Ketchup Flowing", Fast Company, May 24, 2012, [retrieved on Aug. 9, 2013], <http://fastcoexist.com/1679878/mits-freaky-non-stick-coating-keeps-ketchup-flowing>.

Sushant Anand et al., "Droplet condensation and growth on nanotextured surfaces impregnated with an immiscible liquid", Bulletin of the American Physical Society, APS March Meeting 2012, Mar. 2012, vol. 57, No. 1, <http://meetings.aps.org/Meeting/MAR12/Event/167314>.

Nancy W. Stauffer et al., "Novel slippery surfaces: Improving steam turbines and ketchup bottles", MIT Energy Initiative, Jun. 20, 2013, <http://mitei.mit.edu/news/novel-slippery-surfaces-improving-steam-turbines-and-ketchup-bottles>.

International Search Report for PCT/JP2013/068541 dated Aug. 27, 2013.

Communication dated May 9, 2017 from the Japanese Patent Office in counterpart Application No. 2016-137378.

Communication dated Jun. 4, 2018 from the State Intellectual Property Office of the P.R.C. in counterpart Application No. 201710325733.6.

(56) References Cited

OTHER PUBLICATIONS

Communication dated Nov. 2, 2016, from the Korean Intellectual Property Office in counterpart Korean application No. 10-2016-7025038.

* cited by examiner

PACKING CONTAINER HAVING EXCELLENT SLIPPING PROPERTY FOR THE CONTENT

CROSS REFERENCE TO RELATED APPLICATIONS

This application is a National Stage of International Application No. PCT/JP2013/068541 filed Jul. 5, 2013, claiming priority based on Japanese Patent Application Nos. 2012-157744 filed Jul. 13, 2012 and 2012-199236 filed Sep. 11, 2012, the contents of all of which are incorporated herein by reference in their entirety.

TECHNICAL FIELD

This invention relates to a packing container having excellent slipping property for the content and, particularly, to a packing container used for containing viscous contents as represented by ketchup and mayonnaise.

BACKGROUND ART

Plastic containers are easy to form, can be inexpensively produced and have, therefore, been widely used in a variety of applications. Specifically, an olefin resin container of the shape of a bottle of which the inner wall surface is formed by using an olefin resin such as low-density polyethylene and which is formed by direct blow-forming, has been desirably used as a container for containing viscous slurry-like or paste-like contents such as ketchup and the like from such a standpoint that the content can be easily squeezed out.

Further, the bottles containing viscous contents are, in many cases, preserved in an inverted state to quickly discharge the contents or to use the contents to the last drop without leaving them in the bottle. It is, therefore, desired that when the bottle is inverted, the viscous content quickly falls down without adhering or staying on the inner wall surface of the bottle.

To satisfy such requirements, for example, a patent document 1 proposes a bottle of a multilayer structure of which the innermost layer is formed from an olefin resin having an MFR (melt flow rate) of not less than 10 g/10 min.

The innermost layer of this multilayer structure bottle has excellent wettability for the oily content. Therefore, if the bottle is inverted or is tilted, then the oily content such as mayonnaise or the like falls down spreading along the surface of the innermost layer and can be completely discharged without adhering or remaining on the inner wall surface of the bottle (on the surface of the innermost layer).

As for the bottles for containing viscous non-oily contents in which plant fibers are dispersed in water like ketchup, a patent document 2 and a patent document 3 are disclosing polyolefin resin bottles having an innermost layer which is blended with a saturated or unsaturated aliphatic amide as a lubricating agent.

The above patent documents 1 to 3 are all trying to improve slipping property of the plastic containers for the contents based on the chemical compositions of the thermoplastic resin compositions forming the inner surfaces of the containers, and are achieving improvements in the slipping property to some extent. However, limitation is imposed on improving the slipping property due to limitation on the kinds of the thermoplastic resins that are used and on the additives, and striking improvement has not been achieved yet.

Under the above circumstances, in recent years, study has been forwarded to improve slipping property from the physical point of view, too.

For instance, a patent document 4 is proposing a container in which fine hydrophobic oxide particles of an average primary particle size of 3 to 100 nm are adhered on the inner surface thereof.

Further, a patent document 5 is proposing a lid body forming on the surface thereof a water-repellent film of a structure in which fine oxide particles of an average particle size of 5 nm to 100 nm are dispersed and adhered on the surface of a resin film formed from resin particles of an average particle size of 1 μm to 20 μm.

Technologies proposed by the patent documents 4 and 5 are to produce water-repellent property (hydrophobic property) based on a finely rugged surface which is formed on a surface to which the content comes in contact. Namely, an air layer is formed in the voids present in the rugged surface in addition to utilizing the hydrophobic property of the material forming the rugged surface. The air layer repels water more than the material that forms the container and, as a result, the aqueous content is more restrained from adhering.

When the finely rugged surface is formed, adhesion of the aqueous content can be more restrained. With the content being in contact with the finely rugged surface at all times, however, water tends to be condensed very easily in the dents in the finely rugged surface; i.e., dents are filled with the condensed water. As a result, the slipping property decreases and, therefore, it becomes necessary to further improve the slipping property.

PRIOR ART DOCUMENTS

Patent Documents

Patent document 1: JP-A-2007-284066
Patent document 2: JP-A-2008-222291
Patent document 3: JP-A-2009-214914
Patent document 4: JP-A-2010-254377
Patent document 5: Japanese Patent No. 4878650

OUTLINE OF THE INVENTION

Problems that the Invention is to Solve

It is, therefore, an object of the present invention to provide a packing container having markedly improved slipping property and non-adhering property for the content.

Another object of the present invention is to provide a packing container having markedly improved slipping property and non-adhering property for the content owing to a physical surface treatment and a liquid that is held.

Means for Solving the Problems

The present inventors have conducted experiments extensively concerning the packing containers filled with viscous contents such as ketchup and the like, have discovered the fact that the slipping property improves greatly for the contents if a surface (liquid-permeable surface) is formed on the inner surface of the containers enabling a liquid having no affinity for the content to permeate therein and is held therein, and that the slipping property is greatly improved for the content if the liquid having no affinity is held in the liquid-permeable surface, and have thus completed the present invention.

That is, according to the present invention, there is provided a packing container filled with a content, wherein at least part of a surface that comes in contact with the content is a liquid-permeable surface which holds a liquid different from the content.

In the present invention, it is desired that:
(1) The liquid is held in the liquid-permeable surface in an amount of 0.5 to 50 g/m$^2$;
(2) The liquid-permeable surface has fine protuberances distributed thereon and has a mean square surface roughness RMS represented by the following formula (1),

[Numerical 1]

$$RMS = \sqrt{\frac{i}{n}\sum_{i}^{n}(Z(i) - Z_{ave})^2} \quad (1)$$

wherein
n is a number of data points
Z(i) is a value of Z at each data point, and
$Z_{ave}$ is an average value of all Z values,
in a range of 60 nm to 300 nm in a surface shape profile obtained by scanning a range of 10 μm×10 μm by using an atomic force microscope;
(3) The fine protuberances have ends formed by fine particles of an average primary particle size of not more than 200 nm;
(4) The ends of the fine protuberances are round in shape due to said fine particles;
(5) The liquid-permeable surface is formed by externally adding the fine particles or by using a resin that contains the fine particles;
(6) The liquid has a surface tension in a range of 16 to 40 mN/m;
(7) The liquid comprises one or more substances selected from the group consisting of silicone oil, fatty acid ester of glycerin, liquid (fluid) paraffin, and edible fat and oil;
(8) The content is a viscous fluid substance having a viscosity at 25° C. of not less than 100 mPa·s;
(9) The packing container is a bag-like container formed by sticking films together, and the liquid-permeable surface is formed over the whole inner surface of the bag-like container; and
(10) The packing container comprises a container body having a mouth portion and a lid member fitted to the mouth portion, wherein the liquid-permeable surface is formed over the whole inner surface of the container body.

In the invention, the liquid-permeable surface formed on the inner surface of the packing container stands for a surface which, when it is dipped in a liquid and is taken out, does not permit the liquid to escape but permits the liquid to stay and, concretely, stands for a finely rugged surface in which the capillary phenomenon is dominant over the gravity.

In the invention, further, the liquid different from the content is held in the liquid-permeable surface in a state where the content is being filled. This means that the liquid held in the liquid-permeable surface has no affinity for the content. This is because if the liquid has affinity for the content, then the content that is filled mixes with the liquid that is held in the liquid-permeable surface, and the liquid escapes from the liquid-permeable surface and is no longer held therein in a state where the content is being filled.

Effects of the Invention

In the packing container of the present invention, a liquid (hereinafter often called lubricating liquid) having no affinity for the content is held in the inner surface of the container with which the content comes in contact.

Namely, in the packing container of the present invention with reference to FIG. 1 that illustrates the principle of the present invention, the liquid-permeable surface 1 with which the content 7 that is filled comes in contact, is a finely rugged surface in which the capillary phenomenon becomes dominant over the gravity. The surface 1 holds the lubricating liquid 5 which is a liquid having no affinity for the content 7. Therefore, the content 7 can be discharged out of the packing container along the inner surface (liquid-permeable surface 1) of the container while coming in contact with the lubricating liquid 5. Therefore, even the content 7 such as ketchup or mayonnaise which is a viscous fluid can be very quickly discharged by tilting or inverting the container, very effectively preventing the content from adhering or remaining on the inner surface of the container.

When, for example, the inner surface of the container is formed by using an olefin resin blended with a lubricating agent such as aliphatic amide without, however, forming the liquid-permeable surface, a layer of the lubricating agent that has bled into the inner surface of the container works as a lubricating layer. In this case, however, the inverted fall-down property for the content is smaller than that of the present invention as much as tens to hundreds of times as will be understood from the experimental results of Examples appearing later. That is, when the layer of the lubricating agent formed in the inner surface of the container works as a lubricating layer, the interface between the content and the lubricating layer is a solid-liquid interface. When the liquid layer held in the liquid-permeable surface works as a lubricating layer like in the present invention, on the other hand, the interface becomes a liquid-liquid interface, presumably, accounting for the improvement of the slipping property for the content to a degree of as much as tens to hundreds of times as great.

If no lubricating liquid is held in the surface that should have served as the liquid-permeable surface in the inner surface of the container, the slipping property for the content is insufficient, either, as will be understood from the experimental results of Examples appearing later. In this case, therefore, the inverted fall-down property for the content cannot be improved, and the content cannot be prevented from adhering or remaining.

BRIEF DESCRIPTION OF THE DRAWINGS

FIGS. 3A and 3B are views showing the liquid-permeable surface as observed by using an atomic force microscope, wherein FIG. 3A is a view of three-dimensional image of the liquid-permeable surface of the invention, and FIG. 3B is a graph representing a profile of shape in cross section.

BEST MODES FOR CARRYING OUT THE INVENTION

Figure 1:
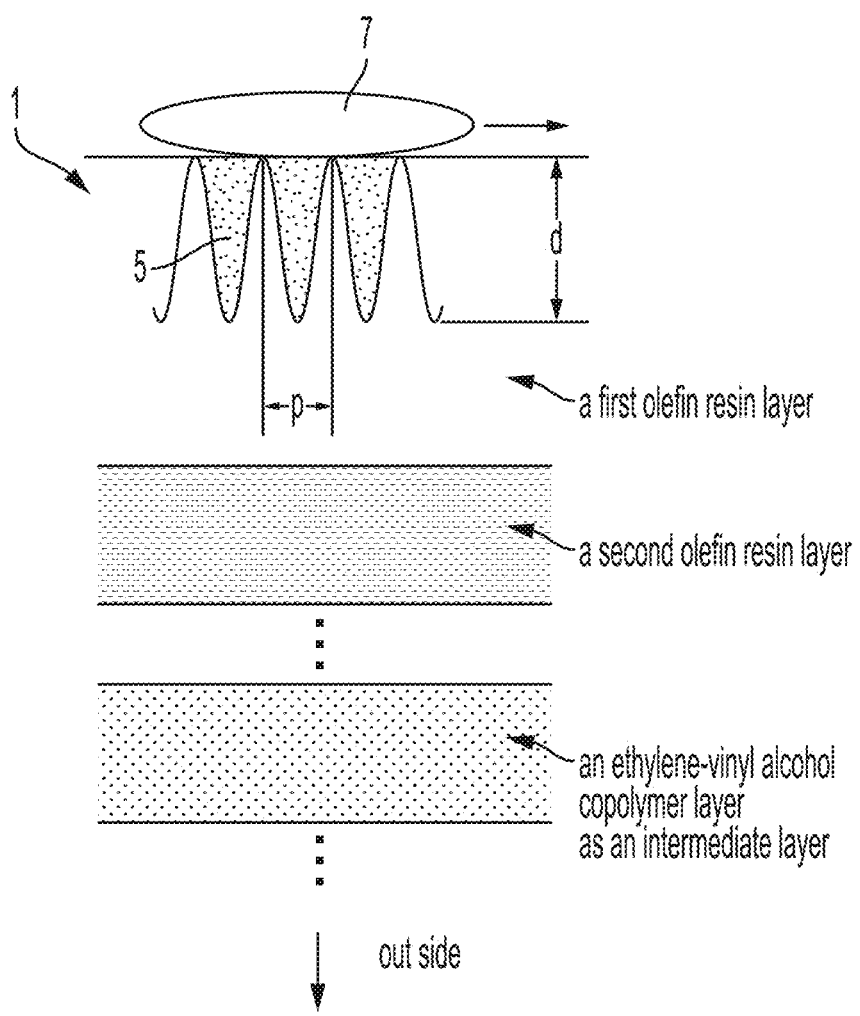
FIG. 1 is a view illustrating the principle of the present invention.

<Materials and Forms of the Containers>
There is no limitation on the materials and forms of the packing containers of the present invention so far as they are capable of forming a finely rugged surface that becomes the liquid-permeable surface as will be described later on the inner surface of the containers.

For example, the container material may be a thermoplastic material (e.g., polyesters as represented by polyethylene terephthalate or olefin resin), or the containers may be formed by using a metal, a glass or various ceramics. Besides, their forms may be a cup, a bottle, a bag (pouch), a syringe, a pot or a tray depending on the container material. The plastic containers may have been stretch-formed.

The packing container of the invention features very good discharge property for the content, such as inverted fall-down property for the content or preventing the content from adhering or remaining. It is, therefore, desired that the packing container of the invention is used for containing viscous contents such as ketchup and mayonnaise, or for containing liquid contents (e.g., dressings) in which solid components are dispersed, and assumes the form of, specifically, a bag (pouch) or a bottle.

The packing container of the invention can be formed by using a known olefin resin, such as low-density polyethylene, linear low-density polyethylene, intermediate- or high-density polyethylene, polypropylene, poly(1-butene), or poly(4-methyl-1-pentene). It is allowable, as a matter of course, to use a random or block copolymer of α-olefins, such as ethylene, propylene, 1-butene or 4-methyl-1-pentene. It is, further, allowable to use a cyclic olefin copolymer disclosed in the above-mentioned patent document 1 (JP-A-2007-284066).

A bag (pouch) container is obtained by sticking together the films formed by an ordinary method such as casting method, T-die method, calender method or inflation method, and heat-sealing the circumferential edges thereof.

Further, the container may have a multilayer structure including an innermost layer, an outermost layer, and an intermediate layer between these two layers. The multilayer structure can be formed by an ordinary method such as dry lamination, coating or melt co-extrusion.

The intermediate layer is desirably a gas-barrier layer formed by using, usually, a metal foil such as aluminum foil, or gas barrier resin such as an ethylene-vinyl alcohol copolymer (saponified product of ethylene-vinyl acetate copolymer) or an aromatic polyamide, and is, most desirably, formed by using the ethylene-vinyl alcohol copolymer. That is, by using the gas-barrier resin as a resin for forming the intermediate layer, it is allowed to impart oxygen-barrier property to the intermediate layer. Specifically, the ethylene-vinyl alcohol copolymer exhibits a particularly excellent oxygen-barrier property. Therefore, it is allowed to effectively suppress the content from being oxidized and deteriorated by the permeation of oxygen, at the same time, making it possible to maintain excellent slip-down property and excellent content preservation property.

The desired thickness of the gas-barrier intermediate layer is, usually, in a range of 1 to 50 μm and, specifically, 9 to 40 μm.

If the above gas-barrier resin is used as the intermediate layer, it is desired that the intermediate layer is provided via adhesive resin layers in order to improve adhesion to the inner and outer layers, and to prevent delamination. The intermediate layer is thus firmly adhered and fixed to the inner and outer layers. The adhesive resin used for forming the adhesive resin layers has been known per se. For example, there is used a resin that contains, in the main chain or the side chain thereof, the carbonyl groups ($>C=O$) in an amount of 1 to 100 meq/100 g of the resin and, specifically, in an amount of 10 to 100 meq/100 g of the resin or, concrete, that contains an olefin resin graft-modified with a carboxylic acid such as maleic acid, itaconic acid or fumaric acid or an anhydride thereof, or with an amide or an ester; an ethylene-acrylic acid copolymer; an ionically crosslinked olefin copolymer; or an ethylene-vinyl acetate copolymer. The adhesive resin layer may have a thickness with which a suitable degree of adhesive force is obtained and is, usually, a thickness of 0.5 to 20 μm and, preferably, about 1 to about 8 μm.

In the case of the plastic container formed from a thermoplastic material, the resin for forming the container may be blended with a variety of known additives.

Figure 2:
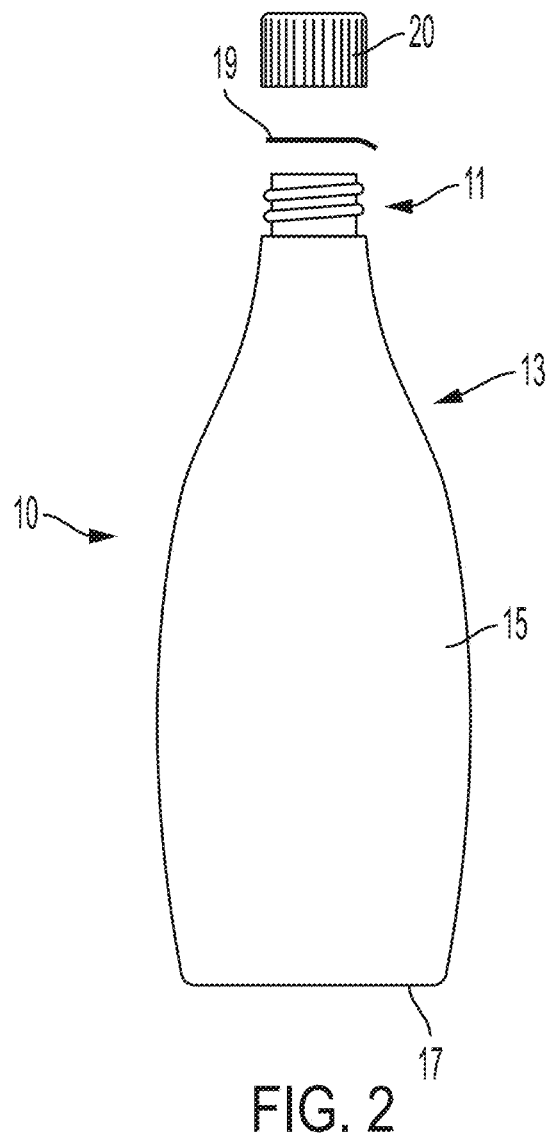
FIG. 2 is a view showing the appearance of a packing container of the present invention.

The container suited for squeezing out the content is in the form of a directly-blown bottle. FIG. 2, the directly-blown bottle is generally designated at 10, and includes a neck portion 11 having a screw thread, a body wall 15 continuous to the neck portion 11 via a shoulder portion 13, and a bottom wall 17 that is closing the lower end of the body wall 15. After the bottle 10 is filled with a viscous content, the opening at the upper end of the neck portion 11 is heat-sealed with a metal foil 19 such as aluminum foil and a predetermined cap 20 is fitted thereto. That is, the bottle 10 is used as a packing bottle. To use the packing bottle, the cap 20 is removed, the metal foil 19 applied with a sealing member is peeled off, and the bottle 10 is tilted or inverted and, as required, the body wall 15 is squeezed to take out the content out of the container.

Further, the above bottle may have a multilayer structure. In this case, a regrind layer may be formed neighboring the outermost layer or the innermost layer by using a mixture of the virgin resin and the scrap resin that generates at the time of forming the containers. In this case, it is desired that the amount of the scrap resin is about 10 to about 60 parts by weight per 100 parts by weight of the outermost virgin layer from the standpoint of reusing resources yet maintaining formability. The thickness of the layer neighboring the outermost layer may vary depending on the size of the packing container or the kind of the content, but should be such that the thickness of the container wall as a whole does not become unnecessarily large and that the scrap resin can be effectively utilized, and is, usually, set to be about 20 to about 200 μm. In the multilayer structure, the innermost layer and the outermost layer may have such thicknesses that assure squeezing property.

<Liquid-Permeable Surface and its Formation>

In the packing container of the invention, the liquid-permeable surface is formed on the inner surface of the packing container with which the content comes in contact. As described already, the liquid-permeable surface is a finely rugged surface in which the capillary phenomenon becomes dominant over the gravity, and is a surface which so holds a liquid (hereinafter often called lubricating liquid) having no affinity for the content that it will not mix with the content filled in the container and will not escape.

That is, the liquid permeates into the surface under a condition where the contact angle θ is smaller than 90 degrees. The liquid that has permeated into the surface, however, cannot be held therein unless the capillary phenomenon is dominant. This is because the liquid escapes due to the gravity.

The range in which the capillary phenomenon remains dominant is called capillary length ($\tau^{-1}$), and is expressed by the following formula, $$\tau^{-1} = (\gamma a/\rho g)^{1/2}$$

wherein γa is an interfacial tension between the liquid and the gas (air), ρ is a density of the liquid, and g is the gravitational acceleration.

Namely, the capillary phenomenon becomes dominant (height of the liquid droplets increases) in a range of from a contact line where the liquid droplets, gas and solid (inner surface of the container) come in contact with each other simultaneously to the capillary length ($\tau^{-1}$). As will be understood from the above formula, the capillary length is a constant determined by the liquid irrespective of the material of the inner surface of the container, and is, for example, about 2.7 mm in the case of water.

With reference, for example, to FIG. 1, therefore, to attain the liquid-permeable surface, the inner diameter of the dents may be set to be shorter than the capillary length ($\tau^{-1}$). The capillary length differs depending on the kind of the liquid (lubricating liquid) but lies in a range of not less than 1 mm in the cases of many liquids. Therefore, the dents having an inner diameter of not more than 1 mm may be distributed over the whole inner surface of the container. In this case, the depth d and pitch p of the dents and the density of the dents (number of dents per a unit area) are desirably so set that the lubricating liquid is held in an amount in a range of 0.5 to 50 $g/m^2$ and, specifically, 1.0 to 50 $g/m^2$. If this amount is small, though dependent upon the depth and pitch of the dents and upon the density of the dents, the content comes in direct contact with the surface of the container among the dents over an increased area without interposing the liquid therebetween. Therefore, the lubricating effect of the liquid is not exhibited to a sufficient degree resulting in a decrease in the effect for improving the inverted fall-down property of the content or in a decrease in the effect for preventing the content from adhering or remaining. Holding the liquid in unnecessarily large amounts, on the other hand, may cause a decrease in the property for retaining flavor of the content and may, further, cause a decrease in the strength of the container wall.

The material for forming the liquid-permeable surface may be selected dependent upon the lubricating liquid that will be described later and the content. For the aqueous content, for example, it is desired to use a non-aqueous (oleophilic) liquid as the lubricating liquid, and form the liquid-permeable surface by using an oleophilic material.

This is presumably because if the material forming the liquid-permeable surface has chemical properties close to those of the lubricating liquid, affinity is exhibited between the material forming the liquid-permeable surface and the lubricating liquid in addition to the effect of the above-mentioned capillary phenomenon, and the lubricating liquid is further stabilized. On the other hand, if the liquid-permeable surface is formed by using a hydrophilic material, if an oily liquid is used as the lubricating liquid and if the aqueous content is brought in contact thereto, then the oily lubricating oil that had been held in advance is substituted with the aqueous liquid since the hydrophilic material of the liquid-permeable surface remains stable when it is permeated with the aqueous liquid. Therefore, properties may be deteriorated. It is, therefore, desired that the material for forming the liquid-permeable surface is suitably selected depending on the chemical properties of the content and of the lubricating liquid.

Here, the liquid-permeable surface (fine dents) is formed by suitable means depending on the material of the container and the form thereof.

Namely, as means for forming the above fine dents, there have been known mechanical means such as metal mold, roll transfer, embossing or spraying, optical means such as photolithography or etching using a laser beam, application or mixing (blending) of fine particles (fine metal oxide particles or fine polymer particles) or porous material, or application or dipping thereof by dispersing them in a solution, application or mixing (blending) of crystalline additives or application or dipping thereof by dispersing them in a solution, lamination of a porous sheet (e.g., nonwoven fabric), or formation of a fine structure based on the crystallization of a resin. Any suitable means may be selected out of them depending on the material of the container or the form thereof to form dents in the liquid-permeable surface.

In the case of a metal container, for example, dents are formed in a portion that becomes the inner surface of the container relying on a mechanical means such as roll transfer or embossing, followed by punching, draw-ironing and the like to form the container.

In the case of a glass container, the glass material of before being formed into the container is blended with a metal oxide powder of a high melting point, a molten crystalline additive is directly applied onto the container that is formed, or the container is spray-coated with, or dipped in, a solution obtained by dissolving the crystalline additive in a solvent to form dents therein.

In the case of a ceramic container, fine dents may be formed by the above-mentioned mechanical means in a green sheet that is to be subjected to the firing.

As for a plastic container, further, any of the above means can be employed for a bag-like container obtained by sticking films and for a cup-like or tray-like container obtained by vacuum-forming or plug assist-forming a sheet-like preform. In the case of bottle-shaped container, fine dents can be formed by injecting a coating material through the mouth portion so as to come in contact with the inner surface or by spraying the coating material onto the inner surface of the container by inserting a jig through the mouth portion followed by drying.

When the inner surfaces of the containers of the above shapes are formed by using a crystalline resin, further, there can be formed a fine structure based on the crystallization of the resin. Upon controlling the resin species and the crystallization temperature, fine dents can be formed.

In the case of a bottle, there can be, further, employed a method of blending the resin that forms the inner surface of the bottle with fine particles for forming dents or with a crystalline additive, or a method of forming fine structure based on the crystallization of the resin.

Namely, the bottle is formed by forming a preform of the shape of a pipe or a test tube by the extrusion forming or injection forming, and blow-forming the preform. Here, if the resin for forming the inner surface is blended (internally added) with fine particles such as metal oxide particles or fine polymer particles in some amounts, then dents or protuberances (dents are formed among the protuberances) having inner diameters determined by the sizes of the particles are formed in the inner surface of the container. Further, if the resin for forming the inner surface is blended with a crystalline additive, then the additive crystallizes and precipitates on the inner surface of the container that is formed as the metal mold cools down, and the above-mentioned fine dents are formed in the inner surface of the container.

As the fine oxide particles, there can be used, for example, titanium oxide, alumina or silica. As the fine polymer particles, there can be representatively used a cured product of polymethyl(meth)acrylate or the like. They are, usually, used in an amount of about 0.2 to about 5 parts by weight per 100 parts by weight of the resin (e.g., olefin resin such as polyethylene or polypropylene, or polyester resin such as PET) that forms the inner surface of the container.

As the crystalline additive, further, there can be used various kinds of waxes such as candelilla wax, carnauba wax, bees wax, microcrystalline wax and paraffin wax. These crystalline additives are added in an amount of about 0.2 to about 10 parts by weight per 100 parts by weight of the resin that forms the inner surface of the container.

Further, the fine structure can be formed based on the crystallization of the resin by using various kinds of crystalline resins as the resin for forming the inner surface of the container. For example, there can be used an olefin resin such as polyethylene or polypropylene, and a polyester resin such as polyethylene terephthalate or the like. By using these resins while controlling the extrusion temperature and the metal mold temperature, it is allowed to control the size of the fine structure formed in the inner surface. The fine structure forms dents due to the crystallization of the resin, and the size of the dents can be increased by so selecting the condition (e.g., by so elevating the metal mold temperature) that the crystal size increases. Further, the crystallization of the resin is strongly affected by the molecular weight and the branching structure of the resin that is used. Therefore, these parameters may be varied to obtain desired fine dents.

The liquid-permeable surface is formed on the inner surface of the container as described above. The liquid-permeable surface is not limited on the inner surface of the packing container body but may be formed, for example, on a portion of a lid member with which the content comes in contact. Formation of the liquid-permeable surface on such a portion makes it possible to avoid such an inconvenience that the content adheres to the lid member.

The liquid-permeable surface can be formed on the inner surface of the lid member by selecting any one of the above-mentioned dent-forming means depending on the material of the lid.

Among the above-mentioned means of forming the liquid-permeable surface on a desired base material, it is desired to use the method by which the fine particles or the porous materials are dispersed in a solvent which is then externally added onto the surface by application, dipping or spray-coating. In this case, it is desired that a material (binder) that has a chemically high affinity for the base material and closely adheres thereto, has been dispersed or dissolved in the solvent. If the base material is the polypropylene (PP), for example, the binder will be fine PP particles, PP dispersed in the form of emulsion, or PP wax. If the base material is the polyethylene, the binder will be fine PE particles, PE dispersed in the form of emulsion, or PE wax.

In the present invention, in particular, the liquid-permeable surface is desirably formed by using the above-mentioned various kinds of fine particles (fine oxide particles or fine polymer particles). That is, upon using these fine particles, it becomes easy to form the liquid-permeable surface that is capable of reliably holding the lubricating liquid that will be described later by adjusting the amount of the fine particles added to the resin or adjusting the amount of the fine particles that are applied.

For example, if the liquid-permeable surface is formed by internally adding fine particles of an average primary particle size of not more than 200 nm and, specifically, 1 nm to 200 nm into the resin that forms the surface or by externally adding them onto the surface, it is desired that the amount of internal addition or the amount of external addition is so adjusted that the fine protuberances are distributed in many number on the surface. That is, if fine protuberances are distributed in many number, spaces among the fine protuberances serve as dents that hold the above-mentioned lubricating liquid.

Here, the average primary particle size of the fine particles may differ depending on the kind and size of the fine particles. In general, however, the average primary particle size is measured by a method of observation by using an electron microscope such as transmission electron microscope or scanning electron microscope, or by a method based on the laser diffraction•light scattering method by using a laser diffraction type particle size distribution-measuring apparatus. The average primary particle size of the fine particles is defined as an average diameter of the primary particles when it is measured based on the observation by using the electron microscope, or is defined as a particle size at an integrated value of 50% in the particle size distribution when it is measured by the laser diffraction•light scattering method.

The fine protuberances are stemming from the fine particles and, therefore, their ends are round in shape. Therefore, the protuberances (or dents among the protuberances) have a shape considerably different from that of when the liquid-permeable surface is formed by the cutting work or by the after working such as laser working.

Figure 3A:
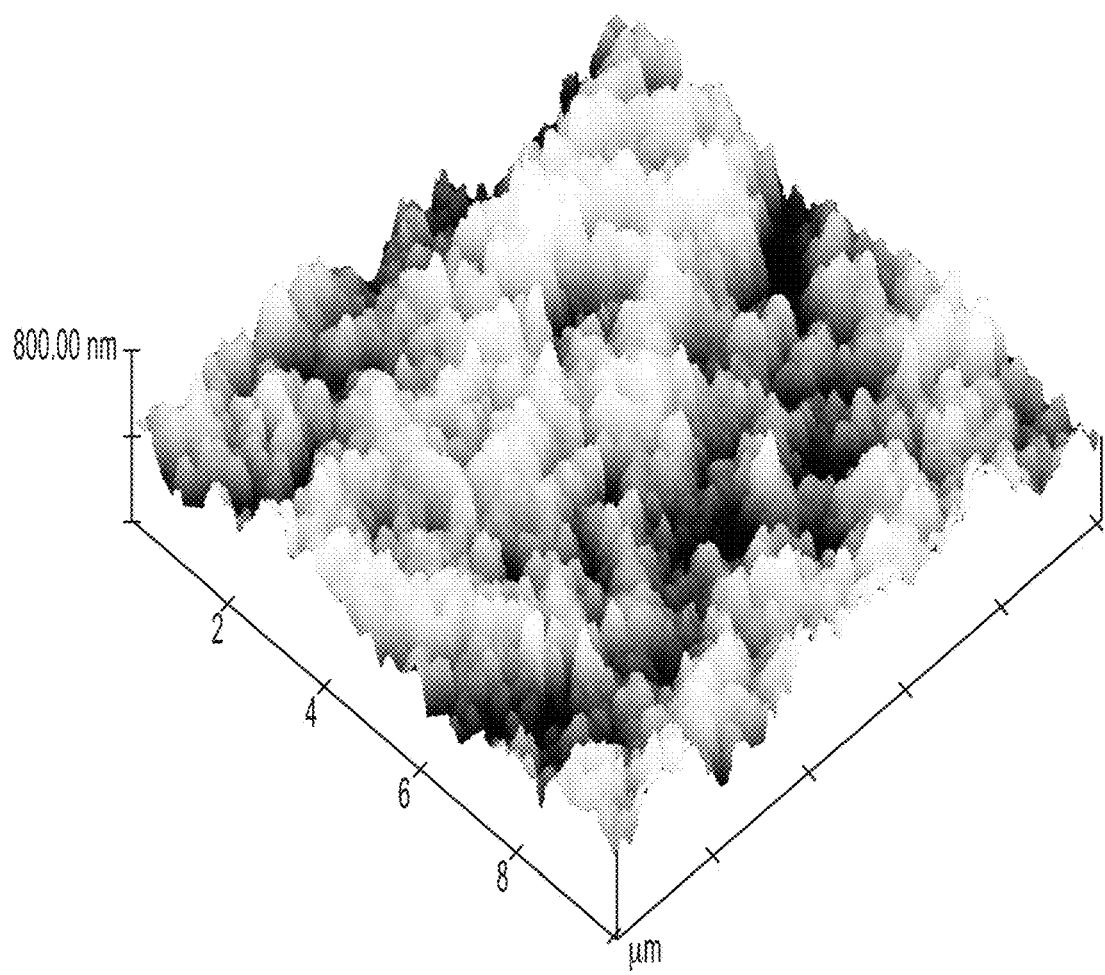
Figure 3B:
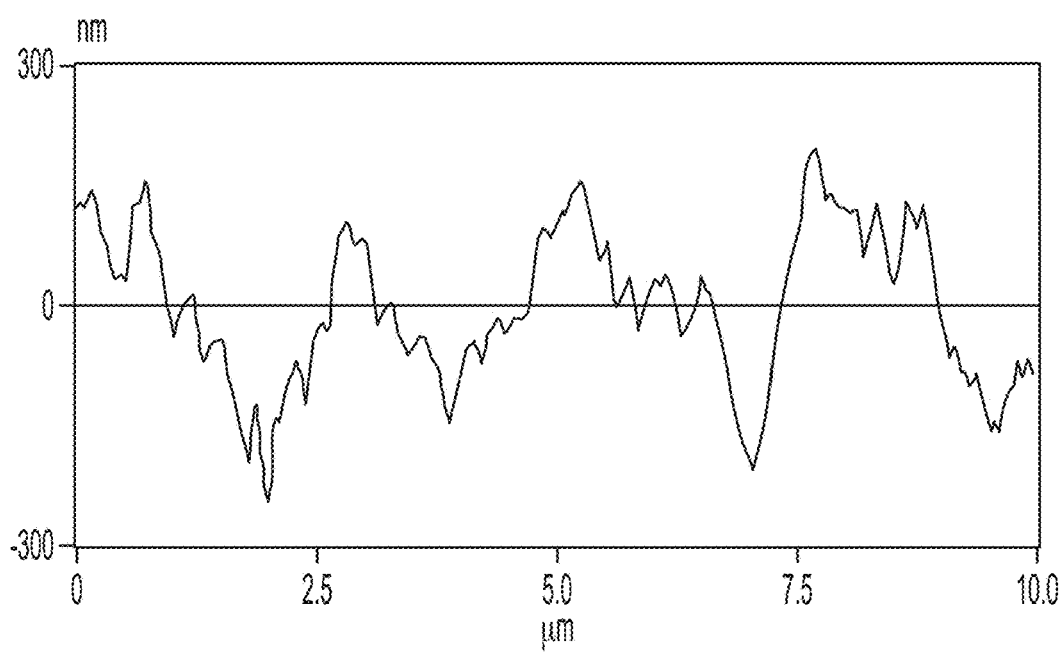

FIGs. 3A and 3B that are attached show a three-dimensional image (FIG. 3(a)) and a profile in cross section (FIG. 3(b)) of the liquid-permeable surface as measured by using an atomic force microscope. The measured results tell that the liquid-permeable surface formed by using the fine particles has a singular profile to a considerable degree making it possible to stably hold the lubricating liquid.

If the liquid-permeable surface is formed by using the above fine particles, it is desired that a mean square surface roughness RMS represented by the following formula (1),

[Numerical 2]

$$RMS = \sqrt{\frac{i}{n}\sum_{i}^{n}(Z(i) - Z_{ave})^2} \qquad (1)$$

wherein
n is a number of data points,
Z(i) is a value of Z at each data point, and
$Z_{ave}$ is an average value of all Z values,
is in a range of 60 nm to 300 nm in a surface shape profile obtained by scanning a range of 10 μm×10 μm by using an atomic force microscope.

<Lubricating Liquids and Contents>

In the invention, the lubricating liquid permeates in the liquid-permeable surface and is held therein. The lubricating liquid permeates and is held by a very simple operation of permeating or spraying the lubricating liquid into the interior of the packing container and, next, draining the lubricating liquid. Namely, in the liquid-permeable surface, the capillary phenomenon is dominant over the gravity. Through the simple permeation operation, therefore, the lubricating liquid of a predetermined amount can be held in the liquid-permeable surface without permitting it to escape.

Here, in the packing container of the invention, the lubricating liquid must have been held in the liquid-permeable surface in a state where the content is being filled. It is, therefore, essential that the lubricating liquid has no affinity for the content. This is because the lubricating liquid, if it has affinity for the content, mixes with the content and escapes from the liquid-permeable surface.

The liquid having no affinity for the content is the one that is not miscible with the content. Roughly speaking, an oleophilic liquid is used as the lubricating liquid for the aqueous content and water, or a hydrophilic liquid is used as the lubricating liquid for the oily content. Usually, however, there may be used, as the lubricating liquid, such a liquid that remains in the inner surface of the container (in the liquid-permeable surface) in an amount as described above (0.5 to 50 g/m$^2$, specifically, 1 to 50 g/m$^2$) after the content is filled in the packing container, is discharged therefrom, or is selectively extracted and removed. Specifically, the more the surface tension of the lubricating liquid is different from that of the content, the higher the effect of lubrication, and for which the present invention is suited. For the aqueous content, for example, there is used a liquid (lubricating liquid) having a surface tension of, preferably, 16 to 40 mN/m and, more preferably, 16 to 35 mN/m.

It is, further, desired that the liquid is lowly volatile, as a matter of course, and produces a vapor pressure with which it does not volatilize even in a state where the packing container remains opened.

In the packing container of the invention, there is no specific limitation on the content that is to be filled. Usually, however, there can be preferably filled, as a content, viscous paste-like or slurry fluid substances (e.g., those having a viscosity of not less than 100 mPa·s at 25° C.) or, concretely, ketchup, aqueous paste, honey, sauces, mayonnaise, mustard, jam, chocolate syrup, cosmetic liquid such as emulsion, liquid detergent, shampoo, rinse and the like. According to the present invention, even the above viscous fluid substances can be quickly discharged without adhering or staying in the inner surface of the container by tilting or inverting the container.

Further, the lubricating liquid according to the invention can be selected from a wide range of choice and, therefore, the contents that can be preferably filled are those containing water, such as ketchup, various sauces, honey, mayonnaise, mustard, jam, chocolate syrup, emulsion and the like. These contents are hydrophilic and, therefore, an oily lubricating liquid is selected. Among the oily lubricating liquids, the one having a low vapor pressure volatilizes or diffuses little and is preferred since it is expected that its effect may last for extended periods of time.

In the present invention, the lubricating liquid that is most preferably used for the above water-containing content is the one having a surface tension that lies in the above-mentioned range and is, specifically, silicone oil, fatty acid ester of glycerin, liquid (fluid) paraffin or edible fat and oil. These substances volatilize little and have been approved as food additives, further, offering such advantages that they are odorless and do not impair the flavor of the content. If, further, added, these lubricating liquids have high surface tensions and cannot be easily held on the surface. However, even these lubricating liquids can be reliably and stably held on the liquid-permeable surface that has a mean square surface roughness RMS that lies in the above-mentioned range (60 to 300 nm) as measured by using, for example, an atomic force microscope.

Of the water-containing contents, those of the non-emulsion type are most desired. This is because the emulsion type contents such as mayonnaise and emulsion tend to entrap, though little by little, the lubricating liquid held in the liquid-permeable surface as the content is discharged repetitively by tilting or inverting the container. The non-emulsion type contents do not exhibit such a tendency.

In the packing container of the present invention as described above, the liquid-permeable surface comprising fine dents is formed by physical means without relying on the container material, and the lubricating liquid is held in the liquid-permeable surface so will not to be removed by the content that is filled. Therefore, the slipping property for the content is very improved. Even when a viscous content is filled, therefore, the slipping property for the content is so high that the content can be quickly discharged without adhering or remaining on the inner surface of the container by tilting or inverting the container.

When empty without being filled with the content, further, the packing container of the present invention is transparent offering such an advantage that the content can be confirmed. Namely, the liquid-permeable surface that merely comprises the fine dents impairs the transparency due to the scattering of light. According to the present invention, however, the lubricating liquid is held on the liquid-permeable surface effectively alleviating a decrease in the transparency caused by the scattering of light.

EXAMPLES

The invention will now be described by way of Examples.
Described below are a variety of properties, methods of measuring properties and resins used for forming the containers (films, bottles) in Examples described below.

Measuring the Slip-Down Speed of the Content.

A test piece measuring 10 mm×60 mm was cut out from a film or a bottle prepared by a method described later, and was stuck onto a fixing jig in a manner that the measuring surface (surface on where the liquid-permeable surface has been formed) was facing upward. 70 Milligrams of a ketchup (produced by Kagome Co.) or 60 mg of a mayonnaise (produced by Kewpie Co.) was placed on the test piece by using a solid-liquid interface analysis system, DropMaster 700, (manufactured by Kyowa Kaimen Kagaku Co.) under a condition of 23° C. 50% RH, and the image thereof on an inclination of 85° was photographed for every specified period of time. A relationship between the time and the moving distance of the ketchup or mayonnaise was found from the obtained images, and an average speed was calculated therefrom.

Testing the Non-Adhesion of the Content.

A test piece measuring 50 mm×50 mm was cut out from the film or the bottle prepared by the method described later, and was stuck onto an aluminum plate in a manner that the measuring surface (surface on which the liquid-permeable surface has been formed) was facing upward. About 2 g of the content was placed on the measuring surface, the aluminum plate to which the test piece has been stuck was tilted, and adhesiveness of the content was evaluated with the eye. The case where the content did not adhere and quickly moved was evaluated to be ⊚, the case where the content did not adhere and moved slowly was evaluated to be Δ, and the case where the content moved while adhering thereto or where the content adhered and did not almost move was evaluated to be X.

The following contents were used. The contents were measured for their viscosities at 25° C. by using a tuning fork oscillator type viscometer SV-10 (manufactured by A & D Co.). Contents that were used:

Ketchup (Tomato Ketchup, produced by Kagome Co., viscosity=1050 mPa·s)
Mayonnaise (Kewpie Mayonnaise, produced by Kewpie Co., Viscosity=2500 mPa·s).
Sauce (Okonomi Sauce, produced by Otafuku Co., Viscosity=560 mPa·s)
Honey (Blended Honey, produced by Kato Bihoen Honpo Co., viscosity=8500 mPa·s)
Jam (Blueberry Jam, Minato Shokai Co.)
Chocolate Syrup (Hershey Chocolate Syrup)

Mustard (Mustard, produced by S.B. Shokuhin Co., Viscosity=380 mPa·s)

Miso (Kondate Iroiro Miso, produced by Ichibiki Co.)

Measuring the Shape of the Liquid-Permeable Surface.

The multilayer film forming the liquid-permeable surface prepared by a method described later was measured for its surface shape of before being applied with the lubricating liquid by using an atomic force microscope (NanoScope III, Digital Instruments Co.). The measuring conditions were as described below.

Cantilever: resonance frequency $f_0$=363-392 kHz, spring constant k=20-80 N/m

Measuring mode: tapping mode

Scanning rate: 0.6 Hz

Scanning range: 10 μm×10 μm

Number of scanning lines: 256

By using a software (Nanoscope: Version 5.30r2) attached to the atomic force microscope, a maximum difference of elevation $R_{MAX}$ and a mean square surface roughness RMS of the scanning range (100 μm$^2$) were found from the obtained data of the three-dimensional shape. The maximum difference of elevation $R_{MAX}$ is a difference between a maximum value and a minimum value of all data points Z(i), and the mean square surface roughness RMS was given by the following formula,

[Numerical 3]

$$RMS = \sqrt{\frac{i}{n}\sum_{i}^{n}(Z(i) - Z_{ave})^2}$$

wherein n is a number of data points

Z(i) is a value of Z at each data point, and $Z_{ave}$ is an average value of all Z values.

Described below are the liquids used as the lubricating liquids. The liquids were measured for their surface tensions at 23° C. by using a solid-liquid interface analysis system, DropMaster 700, (manufactured by Kyowa Kaimen Kagaku Co.). The density of the liquid necessary for the measurement of the surface tension of the liquid, was measured at 23° C. by using a density/specific gravity meter DA-130 (manufactured by Kyoto Denshi Kogyo Co.).

Further, the liquids were measured for their viscosities at 23° C. by using a tuning fork oscillator type viscometer SV-10 (manufactured by A & D Co.). Table 1 shows properties of the liquids that were used.

Lubricating Liquids:

a: silicone oil b: liquid paraffin (hereinafter liquid paraffin A)

c: medium-chain triglyceride d: liquid paraffin (hereinafter liquid paraffin B)

e: glycerin diacetomonooleate f: glycerin trioleate g: olive oil

TABLE 1

| Lubricating liquid | Kind | Surface tension mN/m | Viscosity mPa · s |
|---|---|---|---|
| a | silicone oil | 19.7 | 116.0 |
| b | liquid paraffin A | 28.0 | 6.3 |
| c | medium-chain triglyceride | 28.8 | 33.8 |
| d | liquid paraffin B | 30.2 | 160.0 |
| e | glycerin diacetomonooleate | 30.9 | 47.2 |
| f | glycerin trioleate | 31.3 | 85.2 |
| g | olive oil | 31.4 | 76.5 |

Films and Containers Used for the Experiments.

1. Polypropylene Multilayer Film (PP Multilayer Film).

Total thickness: 90 μm

Layer constitution: PET/AD/AL/AD/PP (AD is an adhesive layer)

2. Polyethylene Terephthalate Film (PET Film).

Thickness: 100 μm

<Multilayer Polyethylene Bottle Blended with Oleic Amide>

Resin for Forming the Innermost Layer and the Outermost Layer:

Resin: low-density polyethylene (blended with 0.3 parts by weight of oleic amide)

MFR: 0.4 g/10 min.

Density: 0.92 g/cm$^3$

Adhesive Layer:

Maleic anhydride-modified polyethylene

Gas-Barrier Layer:

Ethylene-vinyl alcohol copolymer (density, 1.19 g/cm$^3$; Tg, 69° C.)

Resin for Forming the Second Inner Layer:

Resin: low-density polyethylene (blended with 0.03 parts by weight of oleic amide)

MFR: 0.4 g/10 min.

Density: 0.92 g/cm$^3$

Example 1

A coating material A for forming a liquid-permeable surface was prepared by weighing 0.9 g of hydrophobic silica (average primary particle size=7 nm), 1.5 g of a fine granular polypropylene (average particle size=4 μm), 13.8 g of ethanol and 13.8 g of water in a glass bottle, and dispersing them together by using a disperser at 4500 rpm for 10 minutes. By using a bar coater (#6), the above prepared coating material A was applied onto the PP multilayer film on the PP surface side, and was dried in an oven set at 100° C. for 2 minutes. The PP multilayer film forming the liquid-permeable surface was cut out into a size of 100 mm×100 mm, and onto which the lubricating liquid c (medium-chain triglyceride) was applied. After the application, the film was maintained perpendicularly so that excess of the lubricating liquid c was removed to a sufficient degree. The amount of the lubricating liquid c that was held was found from a change in the weight of the film before and after the lubricating liquid c was applied. The amount held was 12.2 g/m$^2$. The lubricating liquid-holding film that was prepared was tested for its content slip-down speed and content non-adhesion property. The results were as shown in Table 2.

Further, the PP multilayer film forming the liquid-permeable surface was partly cut out, and was measured for its liquid-permeable surface shape. The results were as shown in Table 3.

Example 2

A PP multilayer film forming the liquid-permeable surface was prepared under the same conditions as those in Example 1 by using the coating material A for forming the liquid-permeable surface. The PP multilayer film forming the liquid-permeable surface was cut out into a size of 100 mm×100 mm, and onto which the lubricating liquid b (liquid paraffin A) was applied. After the application, the film was maintained perpendicularly so that excess of the lubricating liquid b was removed to a sufficient degree. The amount of the lubricating liquid b that was held was found from a change in the weight of the film before and after the lubricating liquid b was applied. The amount held was 7.2 g/m². The lubricating liquid-holding film that was prepared was tested for its content non-adhesion property. The results were as shown in Table 2.

Example 3

A coating material B for forming a liquid-permeable surface was prepared by weighing 2 g of hydrophobic silica (average primary particle size=7 nm), 4 g of an aqueous emulsion of polypropylene (solid component concentration of 30 wt %), 18.4 g of ethanol and 15.6 g of water in a glass bottle, and dispersing them together by using the disperser at 4500 rpm for 10 minutes.

By using the bar coater (#6), the above prepared coating material B was applied onto the PP multilayer film on the PP surface side, and was dried in the oven set at 90° C. for 2 minutes. The PP multilayer film forming the liquid-permeable surface was cut out into a size of 100 mm×100 mm, and onto which the lubricating liquid c (medium-chain triglyceride) was applied.

After the application, the film was maintained perpendicularly so that excess of the lubricating liquid c was removed to a sufficient degree. The amount of the lubricating liquid c that was held was found from a change in the weight of the film before and after the lubricating liquid c was applied. The amount held was 1.6 g/m².

The lubricating liquid-holding film that was prepared was tested for its content non-adhesion property. The results were as shown in Table 2.

Further, the PP multilayer film forming the liquid-permeable surface was partly cut out, and was measured for its liquid-permeable surface shape. The results were as shown in Table 3. FIGs. 3A and 3B show a three-dimensional image of the obtained surface shape and a profile on a given cross section.

Example 4

A PP multilayer film forming the liquid-permeable surface was prepared under the same conditions as those in Example 3 by using the coating material B for forming the liquid-permeable surface. The PP multilayer film forming the liquid-permeable surface was cut out into a size of 100 mm×100 mm, and onto which the lubricating liquid d (liquid paraffin B) was applied. After the application, the film was maintained perpendicularly so that excess of the lubricating liquid d was removed to a sufficient degree.

The amount of the lubricating liquid d that was held was found from a change in the weight of the film before and after the lubricating liquid d was applied. The amount held was 12.5 g/m².

The lubricating liquid-holding film that was prepared was tested for its content non-adhesion property. The results were as shown in Table 2.

Example 5

A PP multilayer film forming the liquid-permeable surface was prepared under the same conditions as those in Example 3 by using the coating material B for forming the liquid-permeable surface. The PP multilayer film forming the liquid-permeable surface was cut out into a size of 100 mm×100 mm, and onto which the lubricating liquid e (glycerin diacetomonooleate) was applied. After the application, the film was maintained perpendicularly so that excess of the lubricating liquid e was removed to a sufficient degree.

The amount of the lubricating liquid e that was held was found from a change in the weight of the film before and after the lubricating liquid e was applied. The amount held was 3.8 g/m².

The lubricating liquid-holding film that was prepared was tested for its content non-adhesion property. The results were as shown in Table 2.

Example 6

A PP multilayer film forming the liquid-permeable surface was prepared under the same conditions as those in Example 3 by using the coating material B for forming the liquid-permeable surface. The PP multilayer film forming the liquid-permeable surface was cut out into a size of 100 mm×100 mm, and onto which the lubricating liquid f (glycerin trioleate) was applied. After the application, the film was maintained perpendicularly so that excess of the lubricating liquid f was removed to a sufficient degree.

The amount of the lubricating liquid f that was held was found from a change in the weight of the film before and after the lubricating liquid f was applied. The amount held was 3.2 g/m².

The lubricating liquid-holding film that was prepared was tested for its content non-adhesion property. The results were as shown in Table 2.

Example 7

A PP multilayer film forming the liquid-permeable surface was prepared under the same conditions as those in Example 3 by using the coating material B for forming the liquid-permeable surface. The PP multilayer film forming the liquid-permeable surface was cut out into a size of 100 mm×100 mm, and onto which the lubricating liquid a (silicone oil) was applied. After the application, the film was maintained perpendicularly so that excess of the lubricating liquid a was removed to a sufficient degree.

The amount of the lubricating liquid a that was held was found from a change in the weight of the film before and after the lubricating liquid a was applied. The amount held was 14.9 g/m².

The lubricating liquid-holding film that was prepared was tested for its content non-adhesion property. The results were as shown in Table 2.

Example 8

The coating material B for forming the liquid-permeable surface was prepared under the same conditions as those in Example 3. By using the bar coater (#6), the above prepared coating material B was applied onto one surface of the PET film, and was dried in the oven set at 90° C. for 2 minutes. The PET film forming the liquid-permeable surface was cut out into a size of 100 mm×100 mm, and onto which the lubricating liquid c (medium-chain triglyceride) was applied. After the application, the film was maintained perpendicularly so that excess of the lubricating liquid c was removed to a sufficient degree.

The amount of the lubricating liquid c that was held was found from a change in the weight of the film before and after the lubricating liquid c was applied. The amount held was 5.0 g/m$^2$.

The lubricating liquid-holding film that was prepared was tested for its content non-adhesion property. The results were as shown in Table 2.

Example 9

A PET film forming the liquid-permeable surface was prepared under the same conditions as those in Example 8 by using the coating material B for forming the liquid-permeable surface. The PET film forming the liquid-permeable surface was cut out into a size of 100 mm×100 mm, and onto which the lubricating liquid d (liquid paraffin B) was applied. After the application, the film was maintained perpendicularly so that excess of the lubricating liquid d was removed to a sufficient degree.

The amount of the lubricating liquid d that was held was found from a change in the weight of the film before and after the lubricating liquid d was applied. The amount held was 11.3 g/m$^2$.

The lubricating liquid-holding film that was prepared was tested for its content non-adhesion property. The results were as shown in Table 2.

Example 10

A PET film forming the liquid-permeable surface was prepared under the same conditions as those in Example 8 by using the coating material B for forming the liquid-permeable surface. The PET film forming the liquid-permeable surface was cut out into a size of 100 mm×100 mm, and onto which the lubricating liquid g (olive oil) was applied. After the application, the film was maintained perpendicularly so that excess of the lubricating liquid g was removed to a sufficient degree.

The amount of the lubricating liquid g that was held was found from a change in the weight of the film before and after the lubricating liquid g was applied. The amount held was 7.9 g/m$^2$.

The lubricating liquid-holding film that was prepared was tested for its content non-adhesion property. The results were as shown in Table 2.

Comparative Example 1

A low-density polyethylene containing 0.03% by weight of oleic amide was fed as a resin for forming the second inner layer into a 50-mm extruder, a low-density polyethylene containing 0.3% by weight of oleic amide was fed as a resin for forming the outermost layer and the innermost layer into a 40-mm extruder, a maleic anhydride-modified polyethylene was fed as a resin forming the adhesive layers into a 30-mm extruder A, and an ethylene-vinyl alcohol copolymer as a resin for forming the lubricant-barrier intermediate layer into a 30-mm extruder B, was fed all in the form of pellets. A molten parison thereof was extruded through a multilayer die head heated at a temperature of 210° C., and was subjected to the known direct blow-forming to form a four-kind-six-layer bottle of a capacity of 500 g and weighing 20 g.

The Body Layer Constitution of the Bottle was as Follows:
Outermost layer: 30 μm
Adhesive layer: 10 μm
Lubricant-barrier intermediate layer: 25 μm
Adhesive layer: 10 μm
Innermost neighboring layer (second inner layer): 190 μm
Innermost layer: 160 μm The bottle after formed was preserved in an environment of 22° C. 60% RH for 10 days so that the oleic amide was bled on the inner surface side and that the lubricating layer of the oleic amide was formed on the inner surface side of the container. Thereafter, the body portion of the bottle was cut out and the inner surface thereof was tested for its content slip-down speed and content non-adhesion property. The results were as shown in Table 2.

Comparative Example 2

A PP multilayer film forming the liquid-permeable surface was prepared under the same conditions as those in Example 3 by using the coating material B for forming the liquid-permeable surface. The prepared film without being applied with the lubricating liquid was tested for its content non-adhesion property. The results were as shown in Table 2.

TABLE 2

| | Container | | | | |
|---|---|---|---|---|---|
| | Liquid-permeable surface | | | Lubricating liquid | |
| | Yes/No | Constitution | Base material | Kind | Amount applied g/m$^2$ |
| Ex. 1 | yes | hydrophobic silica/PP ptcl. | PP multilayer film | c | 12.2 |
| Ex. 2 | yes | hydrophobic silica/PP ptcl. | PP multilayer film | b | 7.2 |
| Ex. 3 | yes | hydrophobic silica/PP | PP multilayer film | c | 1.6 |
| Ex. 4 | yes | hydrophobic silica/PP | PP multilayer film | d | 12.5 |
| Ex. 5 | yes | hydrophobic silica/PP | PP multilayer film | e | 3.8 |
| Ex. 6 | yes | hydrophobic silica/PP | PP multilayer film | f | 3.2 |
| Ex. 7 | yes | hydrophobic silica/PP | PP multilayer film | a | 14.9 |
| Ex. 8 | yes | hydrophobic silica/PP | PET film | c | 5.0 |
| Ex. 9 | yes | hydrophobic silica/PP | PET film | d | 11.3 |
| Ex. 10 | yes | hydrophobic silica/PP | PET film | g | 7.9 |
| Comp. Ex. 1 | no | no | PE | no | no |
| Comp. Ex. 2 | yes | hydrophobic silica/PP | PP multilayer film | no | no |

TABLE 2-continued

| | Content slip-down speed | | Non-adhesion property | | | | | | | |
|---|---|---|---|---|---|---|---|---|---|---|
| | Ketchup | Mayonnaise | | | | | | | | |
| | mm/min | mm/min | (a) | (b) | (c) | (d) | (e) | (f) | (g) | (h) |
| Ex. 1 | 228 | 59 | ⊚ | ⊚ | ⊚ | ⊚ | ⊚ | ⊚ | ⊚ | — |
| Ex. 2 | — | — | ⊚ | ⊚ | ⊚ | ⊚ | ⊚ | ⊚ | ⊚ | — |
| Ex. 3 | — | — | ⊚ | ⊚ | ⊚ | ⊚ | ⊚ | ⊚ | ⊚ | ⊚ |
| Ex. 4 | — | — | ⊚ | ⊚ | ⊚ | ⊚ | ⊚ | ⊚ | ⊚ | ⊚ |
| Ex. 5 | — | — | ⊚ | ⊚ | ⊚ | ⊚ | ⊚ | ⊚ | ⊚ | ⊚ |
| Ex. 6 | — | — | ⊚ | ⊚ | ⊚ | ⊚ | ⊚ | ⊚ | ⊚ | ⊚ |
| Ex. 7 | — | — | ⊚ | ⊚ | ⊚ | ⊚ | ⊚ | ⊚ | ⊚ | ⊚ |
| Ex. 8 | — | — | ⊚ | ⊚ | ⊚ | ⊚ | ⊚ | ⊚ | ⊚ | ⊚ |
| Ex. 9 | — | — | ⊚ | ⊚ | ⊚ | ⊚ | ⊚ | ⊚ | ⊚ | ⊚ |
| Ex. 10 | — | — | ⊚ | ⊚ | ⊚ | ⊚ | ⊚ | ⊚ | ⊚ | ⊚ |
| Comp. Ex. 1 | 24 | 0.49 | Δ | X | X | X | X | X | X | — |
| Comp. Ex. 2 | — | — | X | X | X | Δ | X | X | X | X |

*In Table, [—] means no experimental data was obtained.
(a): Ketchup,
(b): Mayonnaise,
(c): Sauce,
(d): Honey,
(e): Jam,
(f): Chocolate Syrup,
(g): Mustard,
(h): Miso

TABLE 3

| | Base | | Shape of liquid-permeable surface (10 μm × 10 μm) | |
|---|---|---|---|---|
| | Constitution | material | $R_{MAX}$/nm | RMS/nm |
| Ex. 1 | hydrophobic silica/PP ptcl. | PP multilayer film | 2137 | 234 |
| Ex. 3 | hydrophobic silica/PP | PP multilayer film | 767 | 96 |

From the measured results of the content slip-down speed, it is learned that in Example 1 holding the lubricating liquid in the liquid-permeable surface, the ketchup slips down at a speed of 228 mm/min and the mayonnaise slips down at a speed of 59 mm/min while in Comparative Example 1 having neither the liquid-permeable surface nor the lubricating liquid, the ketchup slips down at a speed of 24 mm/min and the mayonnaise slips down at a speed of 0.49 mm/min, demonstrating a very great difference in the slipping speed of the contents.

From the results of the content non-adhesion test, further, it is learned that the contents tend to adhere and move at low speeds in Comparative Example 1 forming no liquid-permeable surface and in Comparative Example 2 forming the liquid-permeable surface but without using the lubricating liquid. In Examples 1 up to 10 holding the lubricating liquid in the liquid-permeable surface, on the other hand, none of the contents adhere showing high slip-down property.

From the measured results of the liquid-permeable surfaces shown in Table 3 and in FIGs. 3A and 3B, further, it is learned that the liquid-permeable surface of the invention has protuberances distributed thereon having sizes varying in a random fashion. It is, further, learned that the liquid-permeable surface has roughness or an RMS value in a range of 90 nm to 240 nm as measured over a range of 10 μm×10 μm.

DESCRIPTION OF REFERENCE NUMERALS

1: liquid-permeable surface
5: lubricating liquid
7: content
10: multilayer plastic container (bottle)
11: neck portion
13: shoulder portion
15: body wall
17: bottom wall
19: metal foil
20: cap

The invention claimed is:
1. A packing container which is a directly blow-formed bottle filled with a water-containing content, wherein:
said bottle has a multilayer structure inclusive of an inner surface layer that comes in contact with said content, at least part of the surface of said inner surface layer is a liquid-permeable surface formed of a particulate material layer, and said liquid-permeable surface has a mean square surface roughness RMS represented by the following formula (1),

$$RMS = \sqrt{\frac{1}{n}\sum_{i}^{n}(Z(i) - Z_{ave})^2} \quad (1)$$

wherein n is a number of data points,
Z(i) is a value of Z at each data point, and
Zave is an average value of all Z values in a surface shape profile obtained by scanning a range of 10 μm×10 μm by using an atomic force microscope, that lies in a range of 90 nm to 240 nm;
said liquid-permeable surface holds an oily liquid different from said content in an amount of 1.0 to 50 g/m², and wherein:
(a) said particulate material layer forming said liquid-permeable surface, is formed with an olefin resin layer as the underlying layer;

(b) said particulate material layer contains polyolefin particles and fine particles of an inorganic oxide selected from titanium oxide, alumina and silica, the fine particles of said inorganic oxide having an average primary particle size in a range of not larger than 200 nm; and (c) an ethylene-vinyl alcohol copolymer layer is provided as an intermediate layer being located under said olefin type resin layer.

2. The packing container according to claim 1, wherein said oily liquid has a surface tension in a range of 16 to 40 mN/m.

3. The packing container according to claim 1, wherein said oily liquid comprises one or more substances selected from the group consisting of silicone oil, fatty acid ester of glycerin, liquid (fluid) paraffin, and edible fat and oil.

4. The packing container according to claim 1, wherein said water-containing content is a viscous fluid substance having a viscosity at 25° C. of not less than 100 mPa·s.

5. The packing container according to claim 1, wherein said directly-blown bottle comprises a container body having a mouth portion and a lid member fitted to said mouth portion, and wherein said liquid-permeable surface is formed over a whole inner surface of said container body.

6. The packing container according to claim 1, wherein said olefin resin exhibits chemical affinity to an inner surface of the bottle.

7. The packing container according to claim 1, wherein said fine particles of an inorganic oxide are blended in admixture with an olefin resin of the olefin resin layer forming the particulate material layer.

* * * * *